US006240629B1

(12) United States Patent
Libregts

(10) Patent No.: US 6,240,629 B1
(45) Date of Patent: Jun. 5, 2001

(54) TOOL FOR CONNECTING A FLEXFOIL AND A PIN-LINE CONTACT MEMBER

(75) Inventor: Hubertus B. Libregts, Villmen (NL)

(73) Assignee: Berg Technology, Inc., Reno, NV (US)

( * ) Notice: Subject to any disclaimer, the term of this patent is extended or adjusted under 35 U.S.C. 154(b) by 0 days.

(21) Appl. No.: 09/020,379

(22) Filed: Feb. 9, 1998

Related U.S. Application Data

(62) Division of application No. 08/613,218, filed on Mar. 8, 1996, now Pat. No. 5,733,154.

(30) Foreign Application Priority Data

Mar. 9, 1995 (EP) ................................................ 95200581

(51) Int. Cl.$^{7}$ ...................................................... B23P 19/00

(52) U.S. Cl. ................................ 29/753; 29/866; 29/761; 439/877

(58) Field of Search .................................... 439/877, 882, 439/849, 850, 845, 421–424; 29/753, 866, 863, 566.2, 761

(56) References Cited

U.S. PATENT DOCUMENTS

| | | | | |
|---|---|---|---|---|
| 2,921,287 | | 1/1960 | Mathysse et al. . | |
| 4,272,879 | * | 6/1981 | Wigby et al. | 29/566.2 |
| 4,288,918 | * | 9/1981 | Nijman | 29/868 |
| 4,335,497 | * | 6/1982 | Casey | 29/566.2 |
| 4,831,727 | * | 5/1989 | Johnson, Jr. et al. | 29/866 |
| 5,456,005 | * | 10/1995 | Satoh et al. | 29/863 |

FOREIGN PATENT DOCUMENTS

| | | |
|---|---|---|
| 239124 | 8/1960 | (AU) . |
| 1786455 | 4/1959 | (DE) . |
| 1465138 | 1/1965 | (DE) . |
| 1590474 | 8/1965 | (DE) . |
| 39 37 089 | 7/1989 | (DE) . |
| 1337372 | 8/1963 | (FR) . |

* cited by examiner

*Primary Examiner*—Carl J. Arbes
*Assistant Examiner*—Minh Trinh
(74) *Attorney, Agent, or Firm*—Brian J. Hamilla; M. Richard Page

(57) ABSTRACT

A connecting tool for guiding a flexfoil into a connector element. The tool includes a guiding part that directs the flexfoil into the opening in the connector element. The tool also includes a crimping part that urges the clamps of the connector element against the flexfoil. The guiding part and the crimping part of the tool are movable relative to each other.

4 Claims, 5 Drawing Sheets

TOOL FOR CONNECTING A FLEXFOIL AND A PIN-LINE CONTACT MEMBER

This application is a division of application Ser. No. 08/613,218 filed Mar. 8, 1996, now U.S. Pat. No. 5,733,154.

BACKGROUND OF THE INVENTION

The present invention relates to a connector element for connecting a flexfoil and a pin-like contact member. As far as applicant is aware of no such connector element does exist in practice. Flexfoils are widely used for interconnecting electronic components. However, no means are available yet to connect such flexfoils to pin-like contact members, e.g. of connectors, in a releasable way.

It is therefore an object of the present invention to provide a connector element for connecting a flexfoil and a pin-like contact member able to provide as many interconnecting and disconnecting operations as possible.

SUMMARY OF THE INVENTION

Therefore, the present invention provides a connector element for connecting a flexfoil and a pin-like contact member, the connector element being made of a conducting material and comprising a base part, at least one clamping means extending from a first side of the connector element for clamping said flexfoil and at least one further clamping means extending from a second opposing side of the connector element for clamping said flexfoil, and wall means arranged relative to said base part to form an opening for receiving said pin-like contact member. Such a connector element is, in use, connected to the flexfoil by the action of the at least one clamping means, whereas the pin-like contact member may be inserted in the opening defined by the base part and the wall means arranged relative to said base part to form that opening. When inserted the pin-like contact member electrically contacts an exposed conducting path of the flexfoil.

Preferably the connector element comprises a back side provided with at least one clamping lip for clamping said flexfoil. This at least one clamping lip enhances the robustness of the clamping between the connector element and the flexfoil.

The connector element preferably comprises at least one opening in the base part adjacent to the at least one clamping lip. In use the at least one clamping lip is bent inward in the direction of the opening and pushes the rear side of the flexfoil into the opening thereby preventing any relative movement between the flexfoil and the connector element when a pin-like contact member is inserted into the connector element.

In order to further reduce any possibility of relative movement between the flexfoil and the connector element the latter may be provided with an eye in the base part for receiving a lip-like extension of the flexfoil.

At least one further opening may be provided in the base part below at least one of the clamping means for providing the same purpose as the at least one opening in the base part mentioned above.

The wall means arranged relative to said base part to form an opening for receiving the pin-like contact member preferably comprise two opposing, inward bent ears extending form opposite sides from the connector element. Such a connector element, then, may be integrally made by stamping from a thin sheet of metal and be bending the ears and the clamping means, as well as the clamping lip(s) if provided, into the proper position. This kind of connector elements can be easily and inexpensively produced.

The clamping means may be fingers cut out from the ears. Cutting out from the ears may be easily carried out after the stamping operation mentioned above.

Preferably the ears are arranged at the extremity of the connector designed for receiving the pin-like contact member and are provided with a beveled edge for supporting lead-in of the pin-like contact member. By providing these beveled edges insertion of a pin-like member into the connector element is an easy operation.

The present invention is, moreover, directed to a set of the flexfoil and the connector element being connected together, the clamping means being bent inward to clamp the flexfoil and to electrically contact an exposed conducting path of said flexfoil.

The connector element in such a set preferably comprises a back side provided with at least one clamping lip for clamping the flexfoil, each of the lips being bent inward and clamping the flex-foil by a crimping operation. Such a crimping operation is, preferably, carried out in such a way that the lips will be provided with dimples above corresponding openings within the base of the connector element in order to create a strain-relief. Then, it is impossible to establish a relative movement between the flexfoil and the connector element by inserting a mating pin-like contact member into the connector element.

The present invention is also related to a connecting tool for guiding a flexfoil into a connector element defined above and for crimping said flexfoil to said connector, comprising a crimping part at least provided with extensions for crimping the clamping means, and a guiding part for guiding the flexfoil into connector, the crimping part and the guiding part being slidable relative to one another.

In such a connecting tool for guiding a flexfoil into a connector element and for crimping said flexfoil to said connector, the guiding part of the connecting tool may be provided with a slanted wall extending somewhat from its bottom side and suitable to be inserted into the eye of the connector for guiding a lip-like extension of the flexfoil into said eye.

The invention also relates to a method of producing a set of a flexfoil and a connector element as defined above by using a connecting tool defined above, including the following steps:

a. locating said connecting tool and said connector in a predefined relation to one another in which the guiding part abuts the connector;
b. inserting the flexfoil into the connector;
c. pushing the connecting tool against the connector with a predefined force and crimping at least the clamping fingers by means of the extensions.

In step a of such a method of producing a set of a flexfoil and a connector element the slanted wall may be partly inserted into the eye of the connector.

BRIEF DESCRIPTION OF THE DRAWINGS

The present invention will be explained by referring to the annexed drawings showing some preferred embodiments of the present invention. It is observed that the drawings only disclose preferred embodiments and are not meant in any way to limit the scope of the present invention. In the drawings:

FIGS. 1*a,* 1*b,* and 1*c* show a connector element according to the invention and a flexfoil, in which FIG. 1*a* shows them in a disconnected state, whereas

DETAILED DESCRIPTION OF THE PREFERRED EMBODIMENTS

Figure 1A:
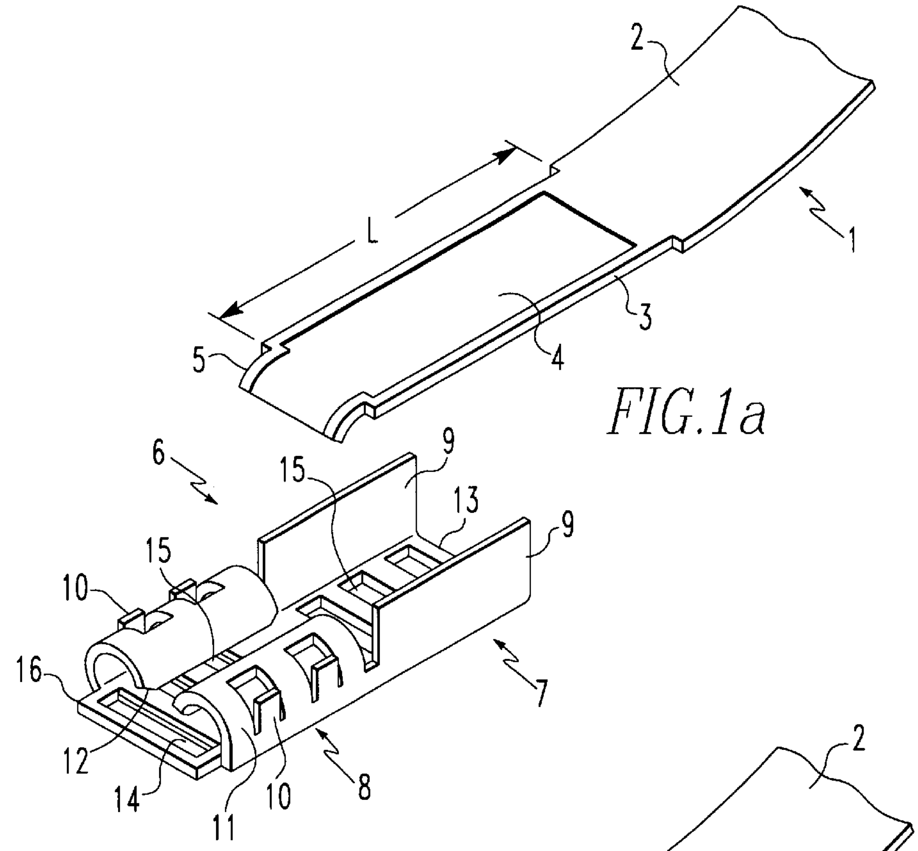

FIG. 1*a* shows a flexfoil 1 provided with a contact terminal 3. The contact terminal 3 comprises an exposed conducting path 4. Reference L denotes the length of the contact terminal 3, which preferably corresponds with the length of the connector element 6. Preferably, the flexfoil comprises a lip-like extension 5, the purpose of which will be explained below. Except the contact terminal 3 and the lip-like extension 5, usually, the conducting path 4 is covered with an insulating layer 2. The conducting path may be made of copper.

Figure 1B:
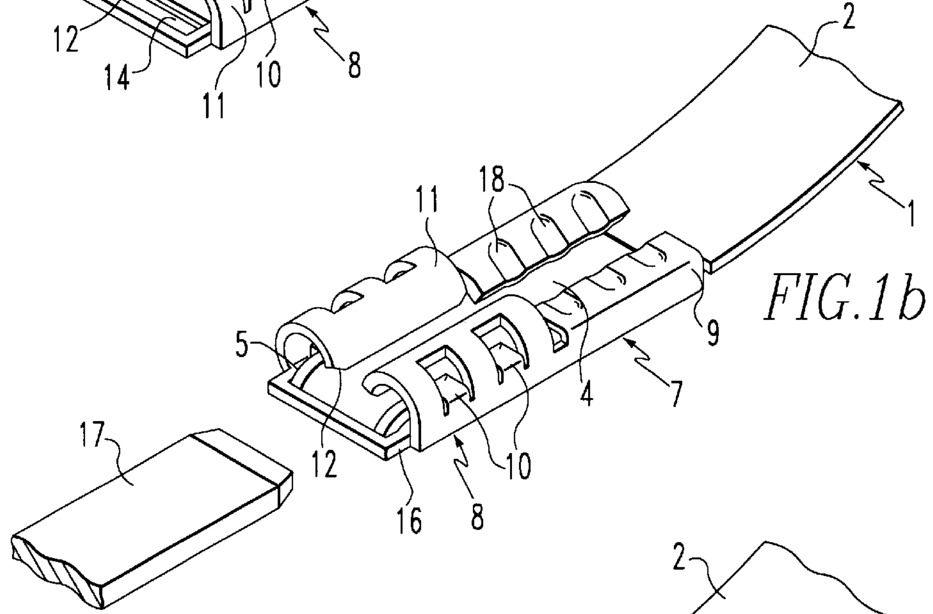
FIGS. 1*b* and 1*c* show them in a connected state.

The connector element 6 comprises at least one clamping means 10, for example a finger as shown in FIG. 1*a*, extending from one side of the connector element 6. At least one other clamping means 10 may extend from an opposing side of the connector element 6 for clamping the flexfoil 1. In the arrangement shown in FIG. 1*a* the connector element 6 comprises two ear-like wall means 11 extending from opposing sides of connector element 6. These ears 11 are bent inward to form an opening for receiving a mating pin-like contact member 17 (FIG. 1*b*). The ears 11 and the clamping fingers 10 are arranged at a front side 8 of the connector element 6, which front side 8 is designed to receive the contact pin 17. At the side designed to receive the contact pin 17 the contact element 6 may be provided with an eye 14 for receiving the lip-like extension 5 of the flexfoil 1. This eye 14 may be provided in a separate extension 16 extending from a base part 13 of the connector element 6.

In order to further enhance the clamping action between the flexfoil 1 and the connector element 6 the latter is preferably provided with a back side 7 provided with at least one clamping lip 9 for clamping the flexfoil 1 to the base part 13.

The base part 13 may be provided with openings 15 both in the front side 8 and the back side 7. Their purpose will be explained below. The openings 15 in the front side 8 are preferably adjacent to or below each of the clamping fingers 10.

Each of the ears 11 may be provided with a beveled edge 12 in order to support the insertion of the pin-like contact member 17 into the connector element 6.

In the arrangement shown in FIG. 1*a* the clamping fingers 10 are cut out from the ears 11. However, the clamping fingers 10 may be provided separately adjacent to the ears 11. The ears 11 are shown adjacent to the extension 16. However, alternatively clamping fingers 10 may be provided adjacent to the extension 16. If no extension 16 is present clamping fingers 10 may be provided directly adjacent to the front edge of the connector element 6. Then, instead of, or additional to, the beveled edges 12 of the ears 11, the clamping fingers 10 may be provided with beveled edges (not shown) to support insertion of the pin-like contact member 17. Of course, also in the arrangement shown in FIG. 1*a*, the clamping fingers nearest to the front edge of the connector element 6 may be provided with such beveled edges (not shown).

Figure 1C:
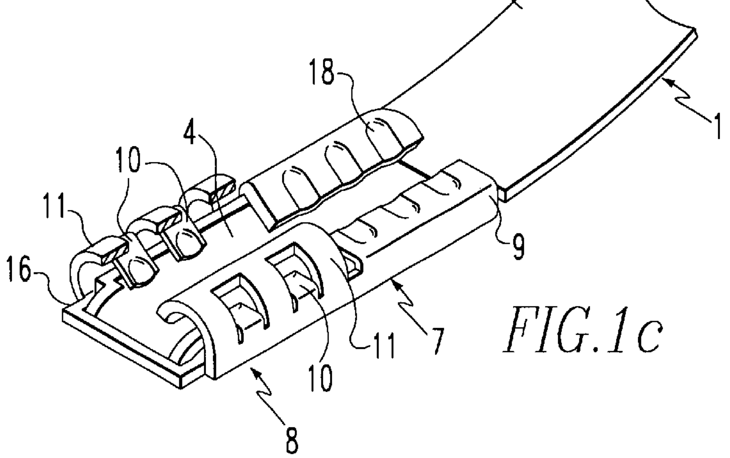

FIG. 1*b* shows the flexfoil 1 and the connector 6 according to FIG. 1*a* in the connected state. The lips 9 are bent inward, and crimped afterwards, in order to rigidly clamp the flexfoil 1 against the back side of the contact terminal 3. Reference sign 18 designates crimp dimples which are preferably located above corresponding openings 15, the purpose of which will be explained below. FIGS. 1*b* and 1*c* (the latter showing essentially the same as FIG. 1*b* except that one of the ears 11 is broken away in order to more clearly show the contact fingers 10) both show the lip-like extension 5 being inserted into the eye 14 (FIG. 1*a*). Moreover, they show that the contact fingers 10 clamp the flexfoil 1. Both the contact fingers 10 and the clamping lips 9 electrically contact the conducting path 4 of the flexfoil 1.

Figure 2:
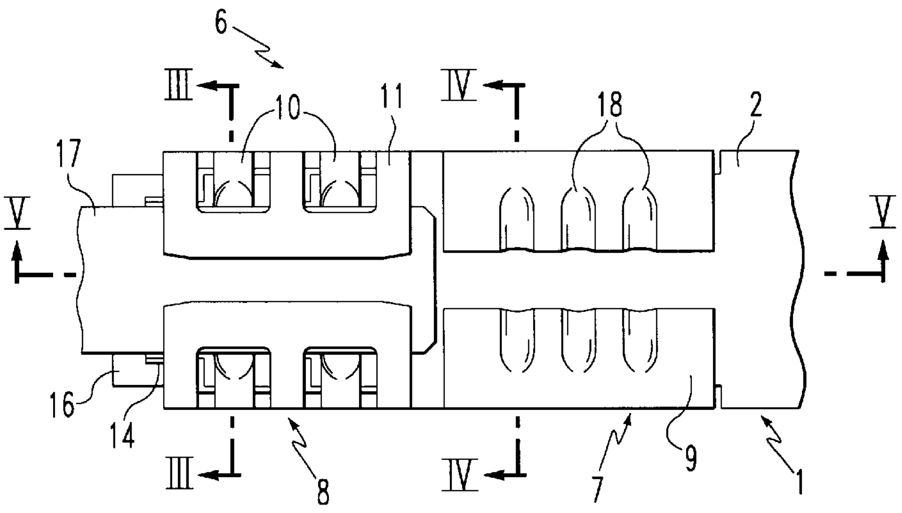
FIG. 2 shows schematically a top view of a connector connected to a flexfoil and a pin-like contact member inserted into the connector element.

FIG. 2 shows a top view of the connector element 6 connected to the flexfoil 1 at the back side 7 and accommodating a mating pin-like contact member 17 inserted into the front side 8. The same parts as in FIGS. 1*a*, 1*b*, and 1*c* are designated by the same reference signs.

Figure 3:
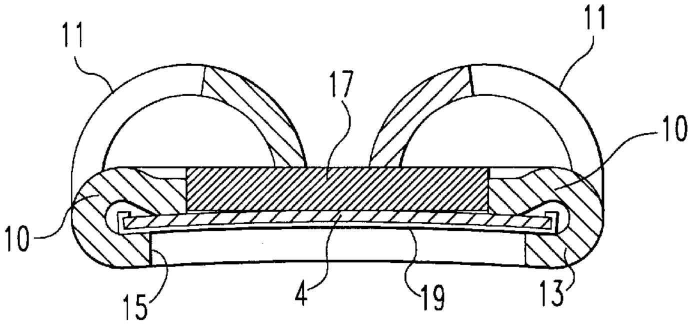
FIG. 3 shows a cross section along line III—III of FIG. 2.

FIG. 3 shows a cross section through the connector element according to FIG. 2 along line III—III. From FIG. 3 it can be deduced that the clamping fingers 10 are bent inward to the base part 13 of the connector element 6 in such a way that the flexfoil 1 is rigidly clamped between the base part 13 and the clamping fingers 10. Moreover, it can be seen that the ears 11 are bent inward in the direction of the base part 13 to an extent to define an opening between their extremities and the base part 13, suitable for receiving the mating pin-like contact member 17. Moreover, the distance between two opposite clamping fingers 10 is designed in such a way that it corresponds to the width of the pin-like contact member 17. When inserted, the pin-like contact member 17 electrically contacts the conducting path 4 of the flexfoil 1. The conducting path 4 is supported by a flexfoil base 19.

Figure 4:
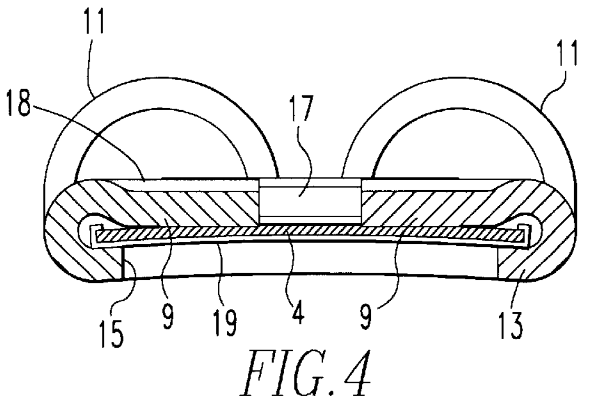
FIG. 4 shows a cross section along line IV—IV of FIG. 2.

FIG. 4 shows a cross section through the connector element 6 according to FIG. 2 along line IV—IV. This line IV—IV intersects two opposing crimp dimples 18. These crimp dimples 18 are the result of the crimping operation referred to above. It can be clearly seen from FIG. 4 that the clamping lips 9 are bent in the direction of the base part 13 to rigidly clamp the flexfoil 1 and that each of the lips 9 electrically contacts the conducting path 4 of flexfoil 1.

Figure 5:
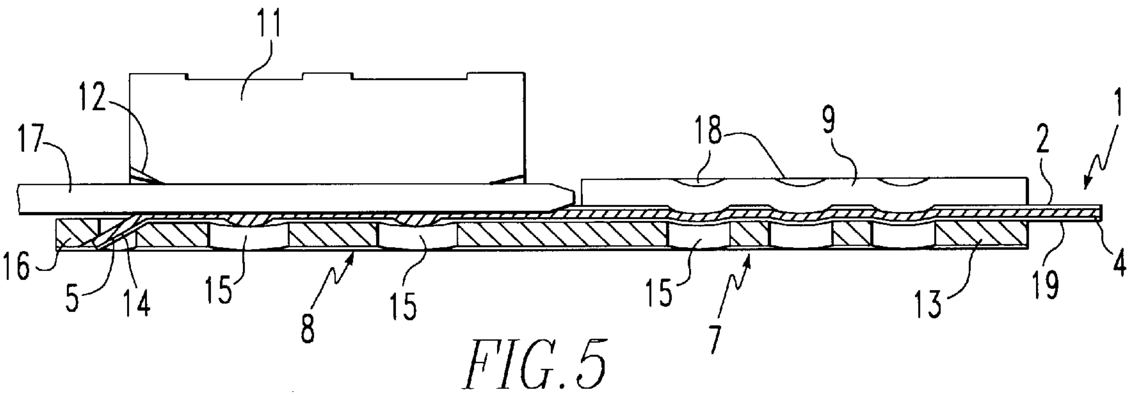
FIG. 5 shows a cross section along line V—V of FIG. 2.

FIG. 5 shows a cross section through the arrangement according to FIG. 2 in the lengthwise direction along line V—V. The same parts as in the preceding figures are designated by the same reference signs. They will not be repeated here.

From FIG. 5 it can be deduced that the eye 14 receiving the lip-like extension 5 of the flexfoil 1 is, preferably, not perpendicular to the surface of base part 13, but has an angle of inclination relative to this surface substantially smaller than $\pi/2$. By the provision of this inclined eye 14 the inserted lip-like extension 5 abuts extension 16 of the connector element 6. Therefore, the lip-like extension 5 cannot easily leave the eye 14 in a direction perpendicular to the surface of base part 13. Still, the lip-like extension 5 does not substantially extend from the bottom side of the base part 13, thereby keeping the space needed for the arrangement shown in FIGS. 2 to 5 as small as possible.

It can be clearly seen from FIG. 5 that the clamping fingers 10 are bent to the base part 13 to an extend that the flexfoil 1 below these clamping fingers 10 is somewhat forced into the openings 15. Therefore, the possibility of sliding of the flexfoil in the longitudinal direction is reduced. Moreover, the lips 9 are crimped into the direction of the base part 13. Crimp dimples 18 results from this crimping operation preferably in such a way that they are located above corresponding openings 15 thereby creating the same effect as clamping fingers 10 above corresponding openings 15.

Figure 6:
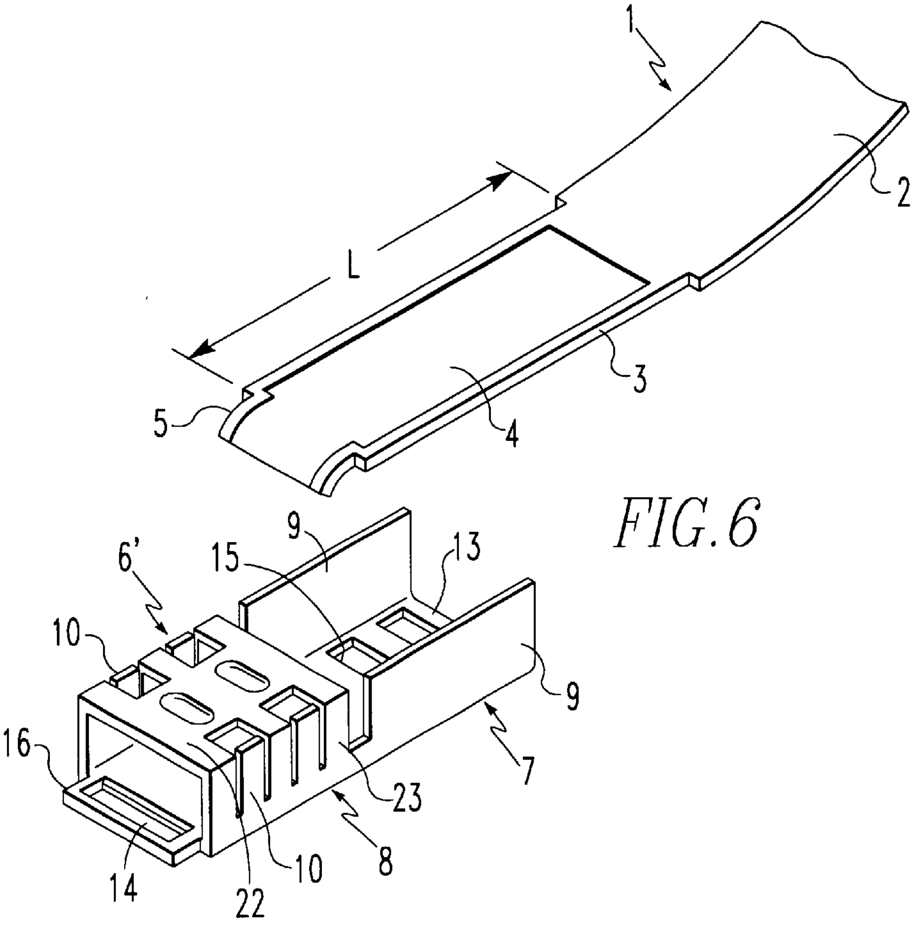
FIG. 6 shows schematically an alternative connector element for connecting a flexfoil and a pin-line contact member.

FIG. 6 shows an alternative embodiment of a connector element 6' according to the invention. The same parts are designated with the same reference signs as in the preceding figures.

Instead of ears 11 the front side 8 of the connector element 6' is provided with a box-type casing comprising a cover part 22 opposite to base part 13 and side walls 23 interconnecting the cover part 22 and the base part 13. The cover part 22, the side walls 23 and the base part 13 are designed in such a way as to define an opening for receiving a pin-like contact member 17, as shown in FIG. 1*b*. The cover part 22 may be provided with one or more dimples 21 to provide a better clamping action between the mating pin-like contact member 17 and the connector element 6' when the contact member 17 is inserted in the connector element 6' . Like the connector element 6 in the preceding Figures, the clamping fingers 10 may be made by cutting out from the side walls 23. Except for the amendments to the front side 8, the connector element 6' corresponds to all embodiments of the connector element 6 shown in the preceding Figures and/or described above.

Figure 7A:
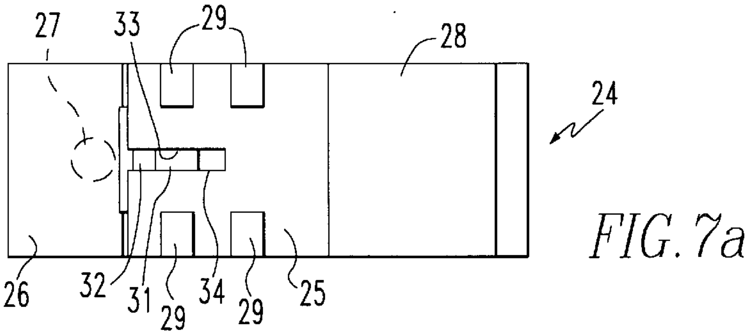
FIG. 7*a* schematically shows a bottom view of a connecting tool for interconnecting the flexfoil and the connector element according to FIGS. 1*a* through 5 and carrying out a crimping operation on the connector element for rigidly clamping action between the connector element and the flexfoil.

FIG. 7*a* shows a bottom view of an example of a special connecting tool 24 for guiding the flexfoil into the connector element 6 and to crimp the clamping fingers 10 and the clamping lips 9 on the flexfoil 1 in order to create a strain/relief, as described above. The connecting tool 24 comprises two parts: a crimping part 25 and a guiding part 26 (see also FIGS. 7*b* through 7*d*).

The crimping part 25 is provided with a first extension 28 at the bottom for crimping the clamping lips 9 as will be explained below. Extension 28 may cover the entire width of the crimping part 25, as shown in FIG. 7*a*. Moreover, the crimping part 25 is provided with as many second extensions 29 as there are clamping fingers 10 for crimping these fingers 10 as will also be explained below.

The crimping part 25 comprises an opening 33 for receiving an extension 34 of the guiding part 26. The extension 34 is slidable up and down within the opening 33 as will become more clear from the description of FIGS. 7*b* through 7*d* below.

Figure 7B:
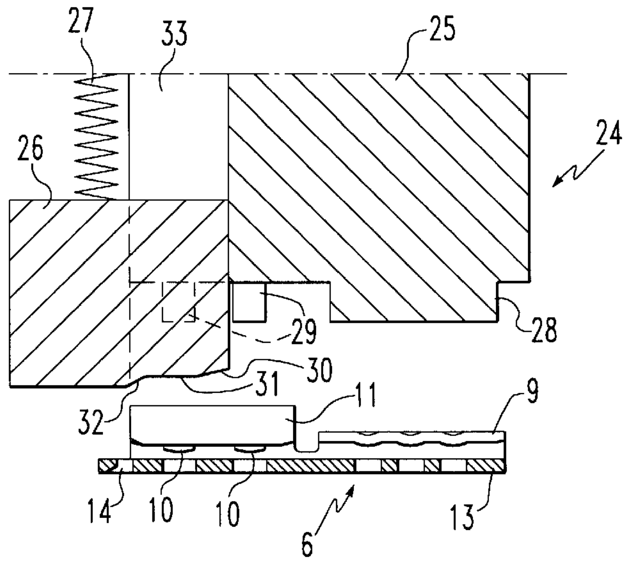
FIGS. 7*b* through 7*d* show in side views subsequent steps of connecting the flexfoil and the connector element according to FIGS. 1*a* through 5 using the connecting tool of FIG. 7*a*.

From the side view of FIG. 7*b* it is evident that the bottom wall of the crimping part 25 is, preferably, subdivided into a first slanted wall 30, a guiding wall 31 and a second slanted wall 32. the second slanted wall 32 extends somewhat below the main bottom wall of guiding part 26 to cooperate with eye 14 of connector 6. FIG. 7*b* shows the connecting tool 24 in its state before a guiding/crimping operation in which a spring 27 forces the guiding part 26 downward relative to the crimping part 25.

Figure 7C:
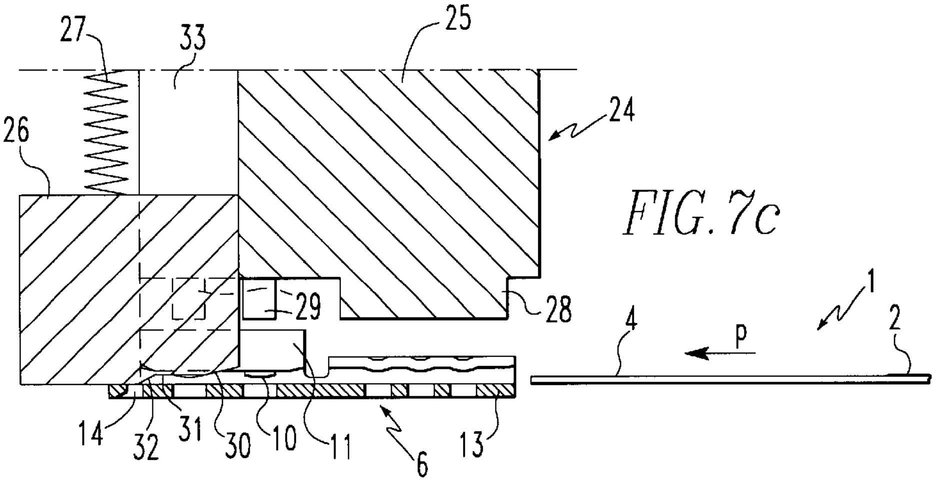

FIG. 7*c* shows the connecting tool 24 in a guiding position for a flexfoil 1 relative to the connector 6. In the situation of FIG. 7*c,* the ears 11, the lips 9 and the clamping fingers 10 are already pre-bent but the spaces left between the lips 9 and the base part 13, and between the fingers 10 and the base part 13 are large enough for the flexfoil 1 to be inserted and connected.

The connector 6 and the connecting tool 24 are moved relative to one another to the situation shown in FIG. 7*c,* i.e. the situation in which the connector 6 only abuts guiding part 26. The extension 34 is thin enough to be received by the space available between the two opposing ears 11 of the connector 6. The second slanted wall 32 is guided into the eye 14 to produce a predefined relation between the connecting tool 24 and the connector 6 before inserting the flexfoil 1.

Then, the flexfoil 1 is inserted into the connector in the direction of arrow P: the front edge of the flexfoil 1 is guided between the lips 9 and the base part 13. The flexfoil is guided by the first slanted wall 30 of the guiding part 26 and then further guided by the flat guiding wall 31 and the second slanted wall 32. The lip-like extension 5 of the flexfoil 1 (see FIG. 1*a*) is automatically guided into eye 14 by the second slanted wall 32.

Figure 7D:
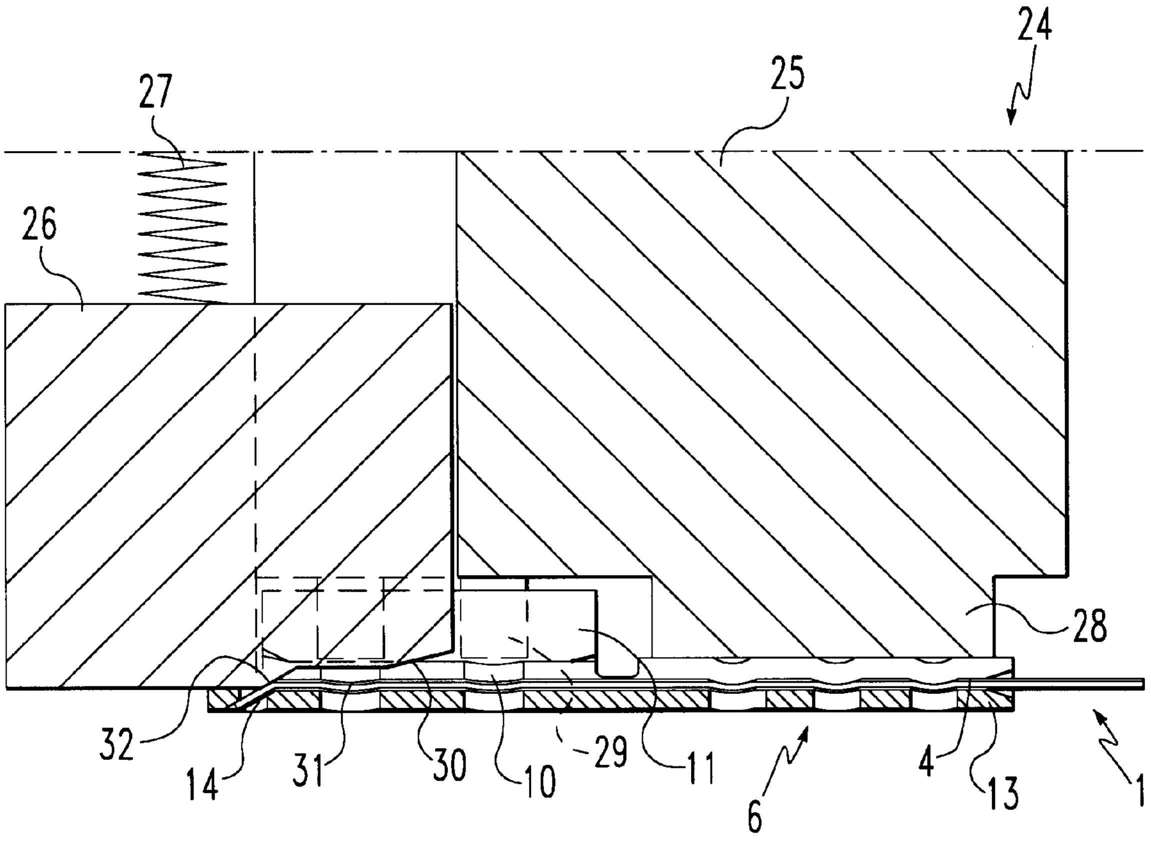

Then, the connector 6 and the connecting tool 24 are further pushed towards one another by exerting a predefined force. The guiding part 26 is able to slide within the opening 33 of the crimping part 25 against the action of spring 27 and retains the same relative position to the connector 6. The crimping part 25, however, is pushed against the connector: its first extension 28 pushes the lips 9 against the flexfoil 1 whereas the second extensions 29 push the fingers 10 against the flexfoil 1, as shown in FIG. 7*d.*

By moving the connector 6 away from the connecting tool 24 the extension 34 of the guiding part 26 leaves the space between the ears 11 and the second slanted wall 32 leaves the eye 14.

The connecting tool shown in FIGS. 7*a* through 7*d* is designed to be used with the connector 6 of FIGS. 1 through 5. However, a connecting tool suitable for use with a connector 6' of FIG. 6 may be designed in accordance with the same principles. For the connector 6' as shown in FIG. 6, of course, the extension 34 of the guiding part 26 must be omitted or, alternatively, the cover part 22 of connector 6' must be provided with a notch to receive the extension 34 of the guiding part 26.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A connecting tool for guiding a flexfoil into a connector element and for crimping said flexfoil to said connector element, wherein said connector element comprises a base part, at least one clamp extending from a first side of the connector element for clamping said flexfoil, at least one further clamp extending from a second opposing side of the connector element for clamping said flexfoil, an eye, and a wall arranged relative to said base part to form an opening for receiving a pin shaped contact member, wherein said flexfoil has as lip-shaped extension, said connecting tool comprising:

a bottom side, a crimping part having extensions for crimping the clamps, and a guiding part for guiding the flexfoil into the connector element, said guiding part including a slanted wall extending from said bottom side and suitable for insertion into the eye of the connector element to guide the lip-shaped extension of the flexfoil into the eye of the connector element, wherein the crimping part and the guiding part are slidable relative to one another.

2. The connecting tool according to claim 1, wherein the extensions of the crimping part comprise a pair of projections on each side of the crimping part.

3. The connector tool according to claim 1, wherein the extensions are located on an outside of the crimping part for bending the clamps inwardly.

4. The connector tool according to claim 3, wherein the crimping part further comprises second extensions for bending a clamping lip on a back side of the connector element.

* * * * *